United States Patent [19]

Zuloaga

[11] Patent Number: 4,537,362
[45] Date of Patent: Aug. 27, 1985

[54] SYSTEM FOR MECHANICALLY GATHERING TREES, BUSHES AND BRANCHES

[75] Inventor: Jose M. A. Zuloaga, Pamplona, Spain

[73] Assignee: Biomasa, S.A., Spain

[21] Appl. No.: 378,216

[22] Filed: May 14, 1982

[51] Int. Cl.³ .............................................. A01D 55/00
[52] U.S. Cl. .................................. 241/101.7; 56/13.7; 144/3 D; 144/335
[58] Field of Search .................. 144/3 D, 34 R, 337, 144/2 N, 335; 56/13.6, 13.7, 13.8, 13.9, 16.6, 119, 159; 241/101.7; 37/2 R

[56] References Cited

U.S. PATENT DOCUMENTS

| | | | |
|---|---|---|---|
| 3,642,041 | 2/1972 | Hamilton et al. | 144/3 D |
| 3,828,536 | 8/1974 | Fowler | 241/101.7 |
| 3,979,075 | 9/1976 | Heron | 144/34 R |
| 4,232,719 | 11/1980 | Payton | 144/34 R |
| 4,236,554 | 12/1980 | Nicholson | 144/34 R |
| 4,338,985 | 7/1982 | Smith et al. | 144/34 R |
| 4,355,670 | 10/1982 | Ohrberg et al. | 144/34 R |

Primary Examiner—W. D. Bray
Attorney, Agent, or Firm—Lucas & Just

[57] ABSTRACT

A system for mechanically gathering trees, bushes and branches, bark, leaves and toppings strewn upon the ground as the result of felling or thinning trees in forests, involving three essential stages: (1) Mechanical collection of trees, bushes, branches and by-products strewn upon the ground and placement thereof in rows; (2) Mechanical collection of these rows by means of travelling equipment which feeds a shredding, crushing or milling machine preferably mounted on its same chassis; and (3) Pneumatic foliage extraction.

7 Claims, 7 Drawing Figures

SYSTEM FOR MECHANICALLY GATHERING TREES, BUSHES AND BRANCHES

At the present time when tree branches are to be chopped, split or simply collected, this is done either by hand or by special purpose cranes which gather these by-products that sometimes are of use for feeding wood shredding plant and at others simply for making piles or bundles of complete branches for subsequent processing.

The disadvantages of collecting by hand may easily be understood, since it is a highly arduous task in itself, and moreover involves many idle periods if the by-product is being used to feed a machine that shreds, chops or crushes it.

While the system whereby cranes are used for collection does save and economize on manual labour, it nonetheless has the great drawback of involving numerous periods of idleness in the machines that are being fed, although it is true that this system cannot be easily replaced by another when conditions in the working area are such as to prevent it.

The system covered by the present invention reduces labour to the minimum, because only a driver-operator is needed, and furthermore it eliminates cranes at all sites where the system can be used.

The present invention concerns a system which is comprised of three stages as detailed hereunder:

1. Mechanical collection of trees and branches and by-products strewn upon the ground by means of a rake or crane, and the placement thereof in rows.

2. Mechanical collection of these rows by means of travelling equipment which lifts them from the ground and feeds them forthwith into a shredding, chopping, crushing, milling or like machine installed on the same chassis or elsewhere, or which simply places them in containers that it then deposits on the ground, or in other containers carried by lorries, for their subsequent transport and processing.

3. Mechanical removal of leaves and twigs and bark, and subsequent deposit of same in a container carried upon the travelling equipment itself, or upon a trailer.

In accordance with the meaning of the invention, and on the basis of the practical construction thereof, the system is essentially comprised of three stages:

1. Collection and placement in rows.

Figure 1:
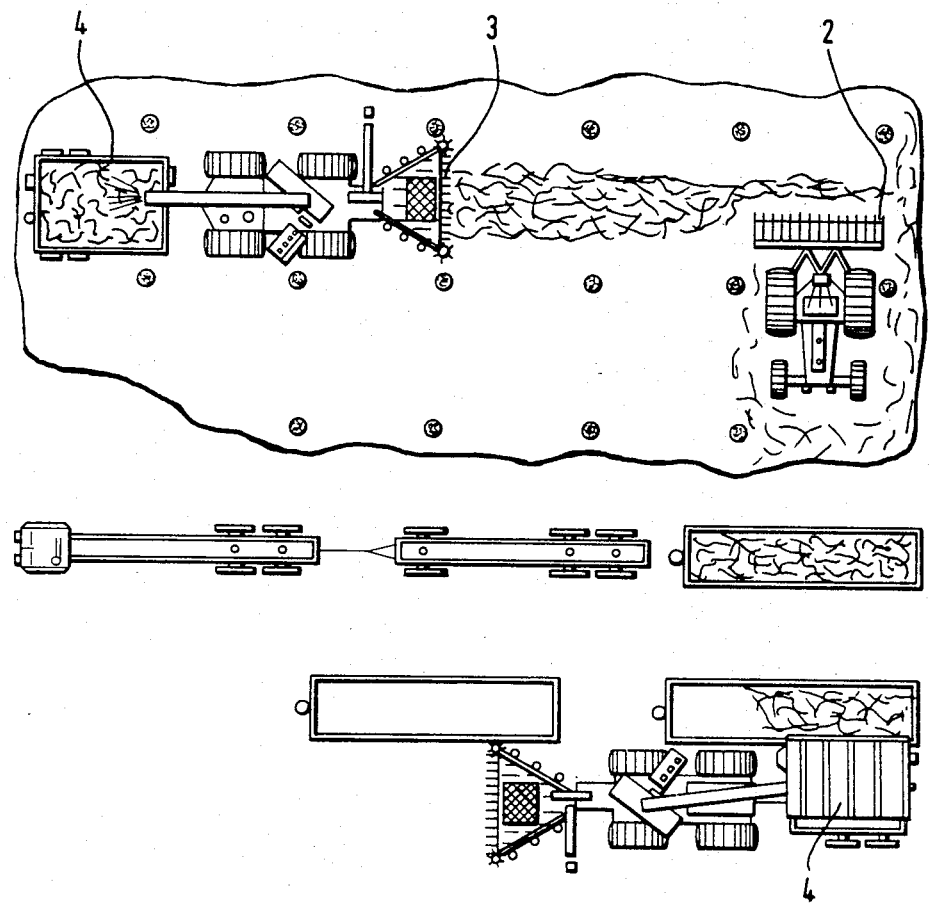
FIG. 1 shows a general view of a timbering site where the different stages of collection or parts of the system may clearly be seen.

This stage may be seen illustrated in FIG. 1 where it can clearly be noted that collection and placement in rows is accomplished by a rake or crane, or forestry tractor if they are complete trees not shown here (2), wherewith such rake, crane or tractor gathers the trees, branches, bark, leaves, toppings and other by-products strewn about the ground as the result of felling or thinning the trees, and places them in rows in readiness for their subsequent loading or processing in a collector or shredding, crushing or chopping machine (3).

Figure 2:
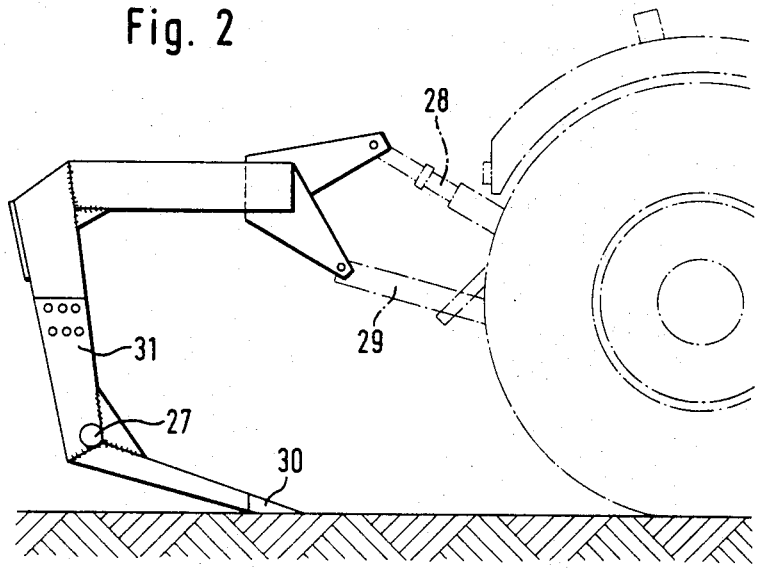
FIG. 2 illustrates the side elevational view of the rake which is used in the first part of this system, more specifically the rake of the figure is one that is dragged along by the tractor.
Figure 3:
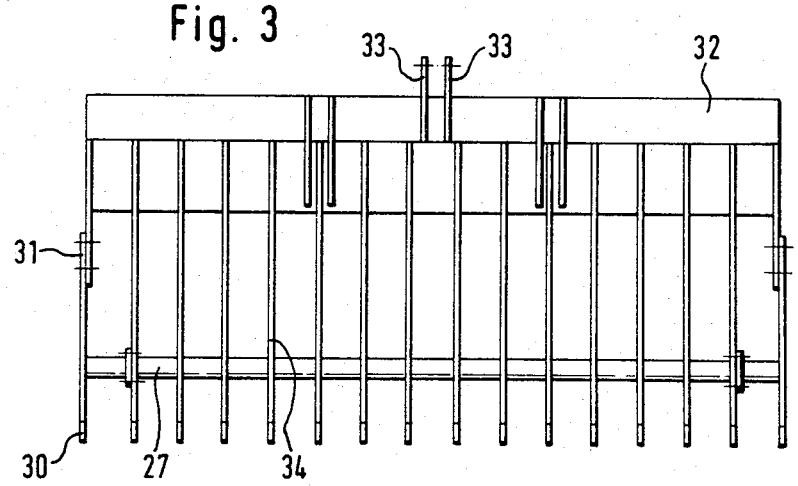
FIG. 3 shows the the front elevational view of the rake as used in the first part of this system.

For this purpose, a rake or a crane (2) is preferably used if the trees are large, and this may be installed on the front or rear of a tractor, it being illustrated in such latter position in FIGS. 2-3. Likewise, the crane for aligning whole trees may be mounted upon a tractor.

This rake is comprised of a number of large prongs (31) which in general are always concave or straight, and being arranged one beside another, they are all attached to a common frame or chassis (32), or alternatively to several smaller frames that are mounted on said common frame, and where the whole is dragged or pushed along by the tractor.

In full accordance with the system covered by this invention, the rake is preferably provided with a number of arms (34) whose top ends are attached to the frame (32) while their bottom ends are secured to a spacer tube (27), the tips (30) of said arms being replaceable.

At the same time, since each arm is concave in shape with reference to the direction of travel, each possesses a side pull bar (29) and a third attachment (28) comprised of a single or double acting hydraulic or compressed air cylinder and plunger unit whose purpose is to raise the arm once it has engaged its load and same requires to be deposited to form the row. No description is given here of the forestry crane in view of its being a sufficiently well-known piece of equipment.

2. Mechanical collection of rows.

The purpose to be achieved during this stage is to pick up the trees, bushes or by-products lying in rows upon the ground for subsequent feeding into a shredding, chopping, crushing, milling or like machine as denoted by (3) in FIG. 1.

Figure 4:
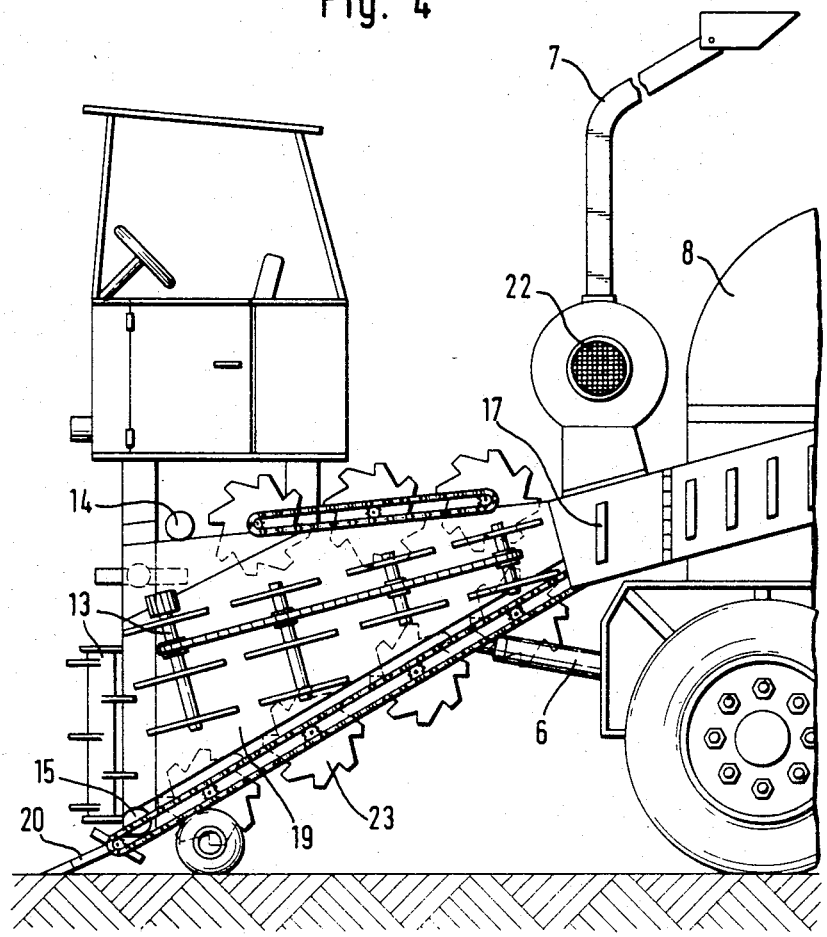
FIG. 4 illustrates a side elevational view of the front half of the apparatus used in the second and third steps.
Figure 5:
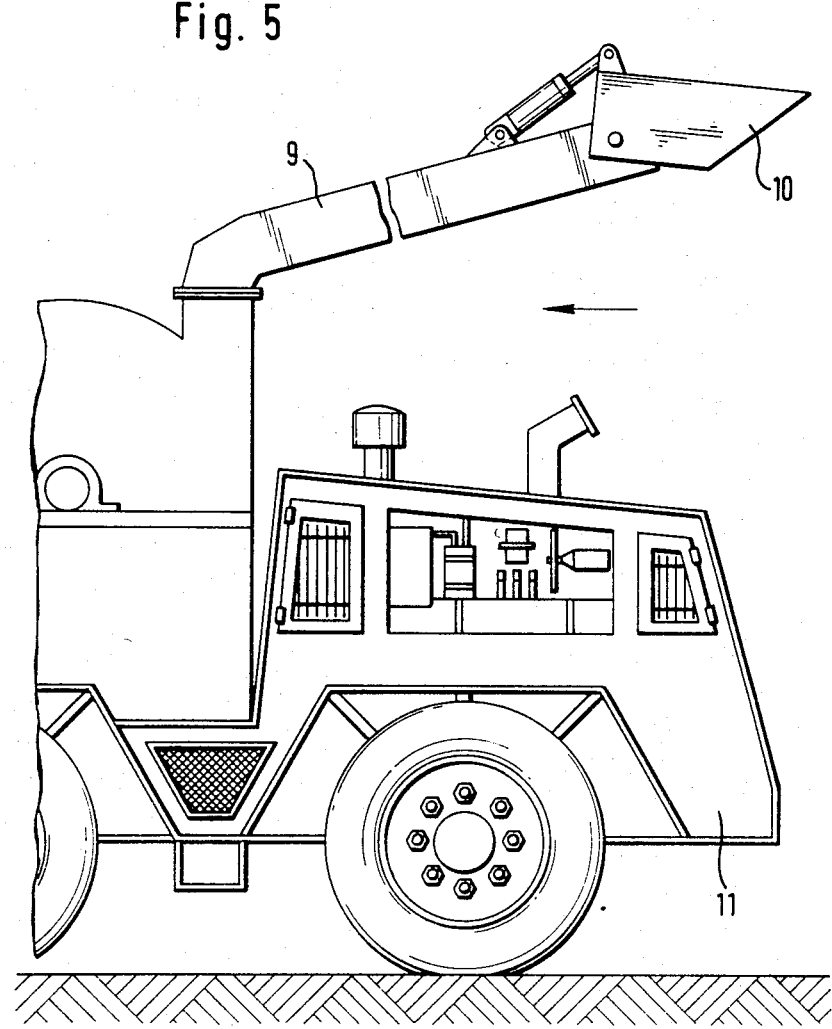
FIG. 5 shows a side elevated view of the rear half of the apparatus used in the second and third steps.
Figure 6:
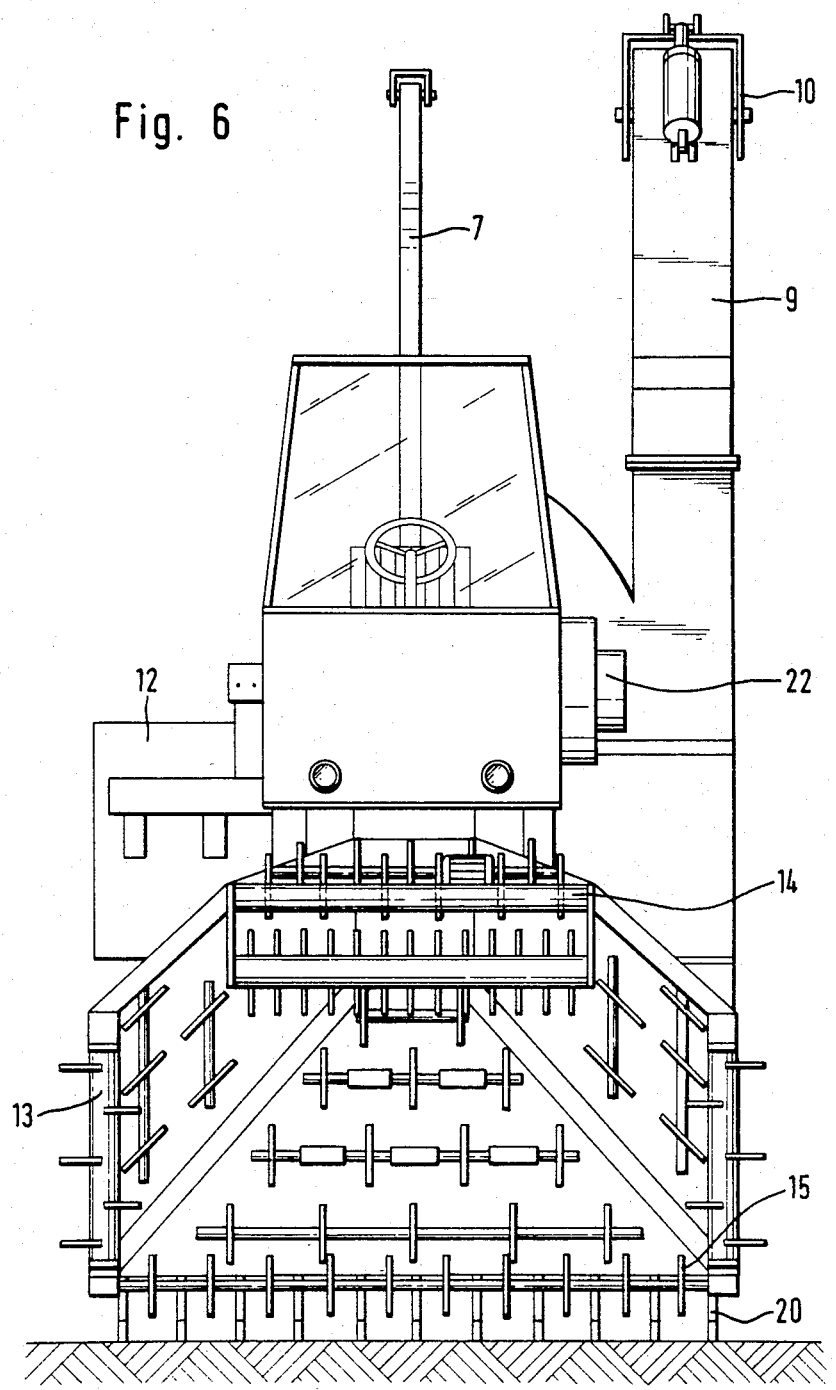
FIG. 6 shows a front elevated view of the apparatus used in steps two and three.

Said purpose is preferably accomplished by a machine (3) shown in FIGS. 4-5-6 which may be equipped with a trailer (4) for collecting the choppings or leaves as required, where same may also be collected in another side trailer, or be left on the ground and spread in another row.

This machine is preferably comprised of a funnel-shaped frame (19) attached to a tractor (11) or semi-trailer which in turn may either carry or not a crushing machine (8), or simply a container (5).

The wide bottom end of the funnel is fitted with a number of collecting teeth (20), and beneath these there is a shaft which drives a set of arms or discs (23) which rotate between the aforementioned teeth (20), and in the opposite direction from that in which the assembly is travelling, thus making the branches or by-products tend to rise up into the funnel, and at the same time their being prevented by cleaner shaft (15) from becoming clogged between the teeth, said shafts being driven by hydraulic, compressed air or electric motors (11).

A further drive shaft (14) is located at the top of the funnel, and is fitted with blades or discs (23) which rotate in the opposite direction from those below, thus assisting the entry of the by-products and removing the foliage.

Two drive shafts (13) are located one at either side of the wide end of the funnel, these likewise being fitted with blades or discs. Said shafts revolve in different directions to one another, thus assisting the entry of the material, its shredding and the removal of the foliage.

The remaining section of the funnel between the small end and the large inlet end is fitted with a number of drive shafts provided with discs or blades and/or feeder chains, which in turn are fitted with teeth or spikes that assist the feed of the material, and in breaking the branches and removing the leaves.

The material which is thrusted and shredded between the inlet mouth and the outlet possesses, when it reaches this latter, a volume that is reduced to match the size of the inlet to the suction, shredder or chopping machine (8), or the container, if fitted.

This collection funnel (19) is attached in such a way to the tractor, trailer or semi-trailer that by means of hydraulic or compressed air operated cylinder and plunger units (6) or like mechanisms, its wide end can be raised or lowered, where the inlet acts as a hinge.

All this mechanism fulfills the requirements for performing the descriptive stage, which is to gather shredded trees, shrubs or by-products and at the same time to remove the foliage from their branches.

Figure 7:
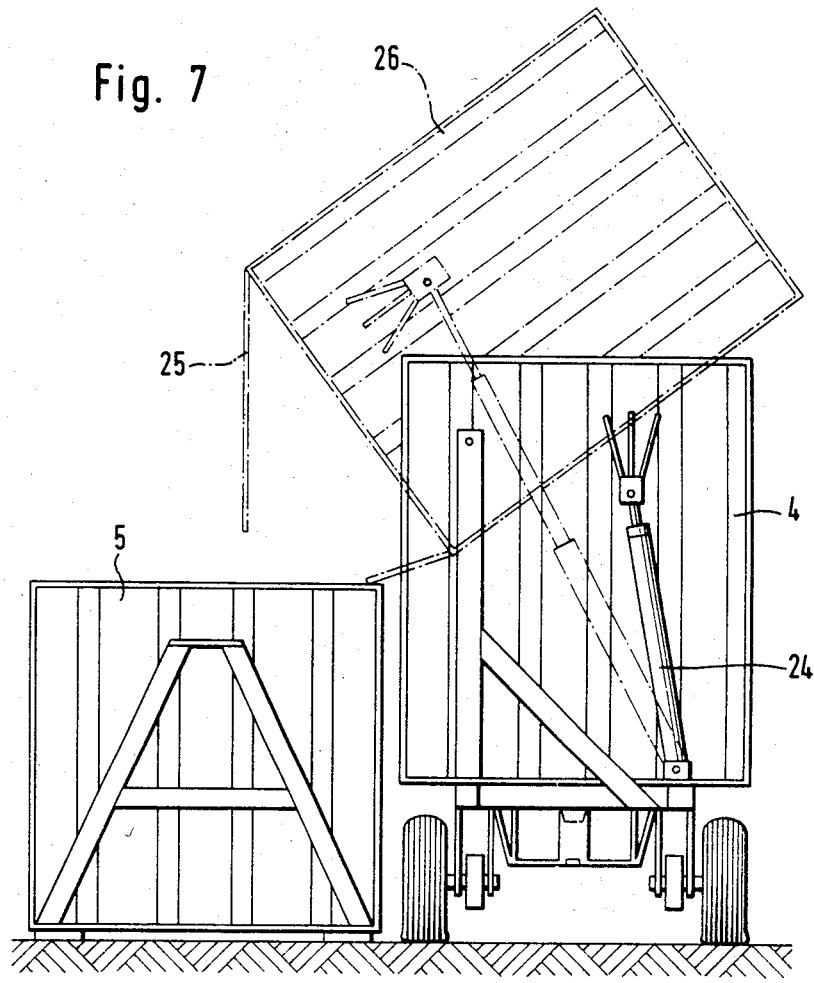
FIG. 7 illustrates a front elevated view of the trailer used in the second and third steps.

The vehicle that carries the rake for gathering, and the shredder or crusher (3), is preferably equipped with a trailer (4) as illustrated in FIG. 7.

Said trailer (4) is fitted with the necessary raising mechanisms such as to enable it to be tipped sideways or rearwards:

As may be noted from FIG. 7, said trailer (4) is equipped with a hydraulic cylinder (24) which enables it to be tipped over sideways (this being the position denoted by dotted lines in said Figure), while furthermore the side cover of same (25) is provided with certain means to allow it to open at the bottom and let the products inside be easily discharged into a container (5).

It is moreover envisaged that the trees, bushes or branches which ride up the rollers once they have been gathered by the fork (20), this being provided with a cleaner (15) to prevent branches from becoming stuck or jammed therein, are fed into the shredder or crusher (8) driven by a motor (12), and guided after shredding along an outlet (9) operated by a hydraulic control (10) so that they will be fed in the desired direction, which will generally be into the trailer (4) placed at the rear of this machine.

3. Removal and subsequent collection of foliage.

Foliage removal takes place inside the collection funnel about whose interior there are strategically placed a number of tubes (17) which are connected to a powerful suction fan (22). Foliage may also be separated simply by gravity through the use of a grating or similar contrivance placed in the bottom.

Said tubes are so positioned as not to hinder the ascent of the branches, and they possess small holes through which they suck the leaves and twigs that become detached through the action of the discs in the funnel.

The leaves and twigs and pieces of bark thus collected by the suction fan (22) are mechanically or pneumatically conveyed to a vessel or container through an adjustable flap outlet (7).

We accordingly proclaim a system for gathering rows of trees, bushes and branches, foliage and bark lying upon the ground, and the subsequent chopping of the materials thus gathered, removal of the leaves adhering thereto, the reduction of its volume and the feeding or conveying thereof to container shredders, crushers, choppers or grinders, and the collection by mechanical means or suction, of the leaves that have previously been detached from their branches by means of agitation inside the collection funnel, and the disposal thereof in a vessel or container.

I claim:

1. A system for collecting ground strewings comprising trees, bushes, branches, bark, leaves and toppings and for separating foliage therefrom, said system comprising:
    (a) a first moving machine for placing said strewings in rows, said machine including a rake with a plurality of prongs of different shapes, said prongs being straight or concave with respect to the direction of movement of said first machine;
    (b) a second moving machine for travel along said rows, said second machine including
        (i) means to pick up said strewings;
        (ii) means to shred said strewings; and
        (iii) means to pneumatically separate foliage from said shredded strewings to form foliage-free shreddings.

2. The system of claim 1 further including means for collecting said foliage-free shreddings.

3. The system of claim 1 wherein said means to pneumatically separate foliage from said shredded strewings comprises a series of pipes beneath which the shredded strewings pass and means creating suction in said pipes.

4. The system of claim 2 wherein the means for collecting is a trailer fitted with a hydraulic cylinder and plunger unit which enables it to tip sideways.

5. The system of claim 1 wherein said rake includes a shaft for cleaning thereof.

6. The system of claim 2 wherein the means to pick up said strewings includes a collection funnel.

7. The system of claim 6 wherein the collection funnel can be vertically raised and lowered to compensate for irregularities in the terrain.

* * * * *